H. GOLDSCHMIDT & F. LANGE.
CLAMPING TOOL FOR HOLDING AND BUTTING RAIL ENDS, BEAMS, AND THE LIKE DURING WELDING.
APPLICATION FILED OCT. 24, 1907.
918,745.
Patented Apr. 20, 1909.
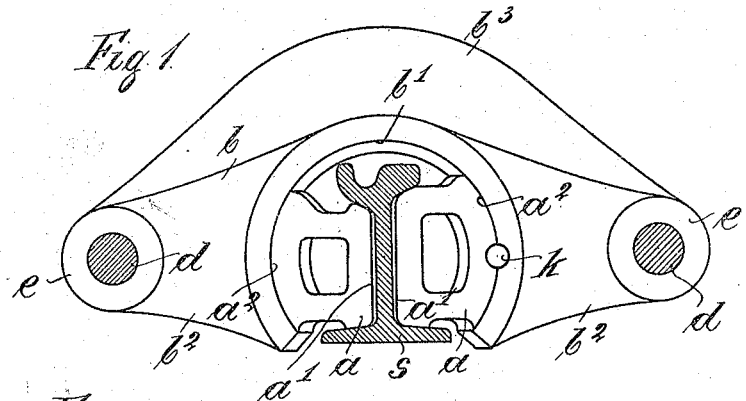
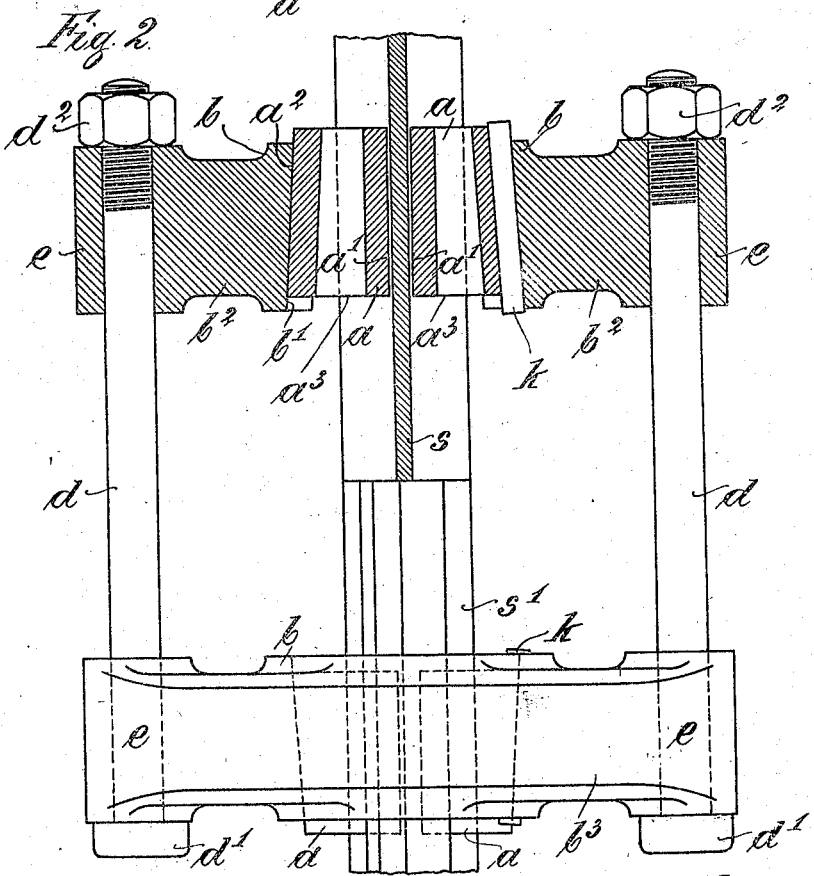
Witnesses:
Paul Wollenberg
Emil Kayser
Inventors:
Hans Goldschmidt
and Felix Lange
by
Attorney

UNITED STATES PATENT OFFICE.

HANS GOLDSCHMIDT AND FELIX LANGE, OF ESSEN-ON-THE-RUHR, GERMANY, ASSIGNORS TO GOLDSCHMIDT THERMIT COMPANY, OF NEW YORK, N. Y.

CLAMPING-TOOL FOR HOLDING AND BUTTING RAIL ENDS, BEAMS, AND THE LIKE DURING WELDING.

No. 918,745.　　　　　Specification of Letters Patent.　　　Patented April 20, 1909.

Application filed October 24, 1907. Serial No. 398,948.

*To all whom it may concern:*

Be it known that we, HANS GOLDSCHMIDT and FELIX LANGE, both subjects of the King of Prussia, German Emperor, and residents of Essen-on-the-Ruhr, in the Province of the Rhine, German Empire, have invented a new and useful Clamping-Tool for Holding and Butting Rail Ends, Beams, and the Like During Welding, of which the following is an exact specification.

This invention relates to the clamping devices used in welding together the ends of rails, girders or other profile irons. Such clamping devices require to be of a portable form so that they may be readily moved from place to place according to the position at which the joint is to be effected. Such clamping devices for instance are employed in welding rails by the well known Goldschmidt process.

The object of the present invention is to provide a simple and efficient construction of clamping device for the purpose indicated.

According to the present invention the clamping is effected by means of dogs which are first caused to grip the rail end or the like which pass through separate parts of the clamp. When the rails are gripped by the dogs the frame pieces carrying these dogs are approached. The frame pieces are provided with suitable guiding means for the dogs so that when the dogs are tightened against the rails these rails are brought into their correct position with regard to one another, that is to say, directly into line. The frame pieces consist as hereinafter described of separate yoke pieces having a central boss which is bored out in conical form. The two yoke pieces being arranged with the wide ends of the cones facing each other. These separate yoke pieces are caused to approach toward one another by means of bolts passing through eye-pieces on each side of the central boss.

The improved clamping device is illustrated in one convenient form in the accompanying drawings in which—

Figure 1 represents a section through the center of Fig. 2 looking toward the wide end of the boss on the yoke piece, Fig. 2 is a plan view of the complete clamping device the upper part being shown in section.

In carrying the invention into effect according to the form shown clamping dogs $a$ are provided with faces $a'$ corresponding to the profile of the rail $s$ forming one of the pieces to be joined. The other piece $s'$ Fig. 2 is also similarly gripped in dogs arranged on the other yoke piece $b$. The dogs $a$ arranged in the boss of the yoke piece $b$ are provided with conical surfaces $a^2$ adapted to bear against the conical bored out part $b'$ of the yoke piece $b$. the boss of the yoke piece is connected by arms $b^2$ with eye-pieces $e$ through which bolts $d$ are passed. The bolts $d$ join the two yoke pieces together. The heads of the bolts $d'$ butt against the lower yoke piece in Fig. 2 while tightening is effected by screwing up the nuts $d^2$. The dogs $a$ may conveniently be cast with openings $a^3$ so as to avoid weight. In order to cause the dog pieces $a$ to bring the rails $s$ and $s'$ into correct alinement a feather $k$ is provided which engages in the boss of the yoke piece $b$ and also in one of the dog pieces $a$. Of course a similar feather $k$ is provided in the lower yoke piece in Fig. 2. A strengthening rail $b^3$ may be provided so as to prevent breakage of the yoke pieces.

The operation is as follows: When two rails for instance are to be joined the yoke pieces are first passed over the ends of the rails and the bolts $d$ passed through. The dog pieces are then inserted by hand, after which the nuts $d^2$ are tightened. In this way the yoke pieces are caused to approach thereby first tightening the dog pieces $a$ against the rail, and simultaneously bringing these rails into exact alinement. The further screwing of the nuts $d^2$ causes the rails $s$ and $s'$ to approach and thereby effect the welding of the two ends which have been heated in any convenient manner as for instance by the above mentioned Goldschmidt process.

In manufacturing the above apparatus the dogs $a$ are conveniently bolted to a piece of rail of the size with which they are intended to work and the assembled dogs and rails are then turned so as to fit the bored out boss of the yoke piece. In this way exact alinement of the two rails is secured.

In the drawings we have illustrated one convenient construction in which the lower part of the boss of the yoke piece is removed. It is for the purpose of facilitating the insertion of the apparatus on rails for instance electric tram rails which are already led on the ground and further this construction enables the yoke piece to be readily removed after the joining is effected. Further instead of using conical surfaces in the yoke piece any form of through going tapered opening may be employed but in all cases the wide end of the tapers in the yoke pieces must face each other. Also instead of providing two pairs of clamping jaws or dogs a larger number may be employed according to the particular profile of the rail or the like dealt with.

We claim:

1. A portable clamping device for use in welding rail lengths and the like comprising two separate yoke pieces each having a central boss with a tapered opening extending through the same, the wide ends of the tapers being toward each other, joining bolts located at each side of the boss for drawing said yoke pieces together, clamping pieces slidable in said tapered openings, said clamping pieces being provided with faces corresponding to the profile of the piece to be gripped and guiding means for said clamping pieces in each yoke whereby the profiles are properly presented, substantially as described.

2. A portable clamping device for use in welding rail lengths and the like having in combination two yoke pieces each having a central boss and an eye-piece on each side of said central boss said central bosses being bored out conically to receive the rail lengths and the like and arranged with their wide ends facing each other, bolts passing through said eye-pieces and adapted to cause the yokes to approach, clamping dog pieces slidably fitted within the conical hole in said central boss and guiding means for one of said dog pieces so as to cause their gripping faces to be correctly presented to the article to be gripped.

3. A portable clamping device for use in welding rail lengths and the like having in combination two yoke pieces each having a central boss open at its lower side to facilitate insertion and removal from the rail or the like, an eye piece at each side of said central boss, said central bosses being bored out conically and arranged with their wide ends facing each other, bolts passing through said eye pieces and adapted to cause the yokes to approach, clamping dog pieces slidably fitted within the conical hole in said central boss and guiding means for one of said dog pieces so as to cause their gripping faces to be correctly presented to the article to be gripped.

In witness whereof we have hereunto set our hands in the presence of two witnesses.

HANS GOLDSCHMIDT.
FELIX LANGE.

Witnesses:
 M. ENGELS,
 ALFRED POHLMEYER.